United States Patent [19]

Bury

[11] 4,073,161

[45] Feb. 14, 1978

[54] FLEXIBLE COUPLINGS

[75] Inventor: Norman Albert Bury, Warrington, England

[73] Assignee: Flexibox Limited, Manchester, England

[21] Appl. No.: 692,392

[22] Filed: June 3, 1976

[30] Foreign Application Priority Data

June 4, 1975 United Kingdom ............... 24032/75

[51] Int. Cl.² .............................................. F16D 3/78
[52] U.S. Cl. ...................................................... 64/13
[58] Field of Search ................... 64/13, 12, 19, 27 NM

[56] References Cited

U.S. PATENT DOCUMENTS

| 2,499,093 | 2/1950 | Fast | 64/13 |
|---|---|---|---|
| 3,500,658 | 3/1970 | Goody | 64/13 |
| 3,703,817 | 11/1972 | Irwin | 64/13 |
| 3,813,898 | 6/1974 | Hatch | 64/13 |

Primary Examiner—Benjamin W. Wyche
Assistant Examiner—R. C. Turner

Attorney, Agent, or Firm—Sughrue, Rothwell, Mion, Zinn and Macpeak

[57] ABSTRACT

A flexible coupling used to transmit power between two shafts and comprising first and second transmission members and a flexible element between and interconnecting the transmission members. The first and second transmission members are each connectible to one of the shafts for rotation therewith and the flexible element is located relative to the transmission members by devices for transmitting power and by a location means for predetermining an amount of in-built deformation in the flexible element. In a specific embodiment, the flexible element consists of a pack of members held together as a sub-assembly by means of a sleeve and a collar press-fitted thereover. The flexible element sub-assembly is deformed to a predetermined amount by a spigot formed on the transmission members; the spigot is removed at two or more points remote from the connection locations on the transmission member to facilitate assembly of the coupling.

2 Claims, 2 Drawing Figures

FLEXIBLE COUPLINGS

The invention relates to flexible couplings used to transmit power between two shafts, and relates in particular to couplings which incorporate elastically deformable elements, such for example as membranes, links or laminae as the flexible element of the coupling.

Conventional forms of coupling, employing elastically deformable elements, are designed so that the flexible element is both fixed in dimensional relation to and transmits power through anchorage points on the associated transmission members of the coupling assembly. The usual method of power transmission and location is by the use for example, of pins, bolts, or sleeves with associated washers and nuts. The dual function of the anchorage point in transmitting power and locating the flexible element requires the use of high precision manufacturing techniques if consistent characteristics are to be obtained in the manufacture of numbers of couplings. The purpose of using such techniques is to control deformation of the flexible element during assembly within limits. It has been found that very small differences between the dimensions of the flexible element and its associated parts can cause deformation of the flexible element and substantial changes in the characteristics of the assembled coupling. This is particularly the case when the couplings are designed so that the anchorage points are holes (or sleeves within holes) lying upon a pitch circle, the position of such holes having to be reproduced exactly on the flexible element and its associated transmission members. It has been found that even when using high precision manufacturing techniques, a proportion of the production of such couplings will be found to have, upon complete assembly, an unacceptable degree of inbuilt deformation of the flexible element. It has also been found that even acceptable amounts of in-built deformation of the flexible element can cause problems in certain operational use.

It is proposed to provide a flexible coupling using an elastically deformable element wherein the functions of power transmission and element location are achieved by related separate means rather than single means.

It is an object of the present invention to mitigate the need for high precision manufacturing methods.

It is also an object of the present invention to partially locate the flexible element by means other than the use of the power transmission/anchorage means.

It is also an object of the present invention to control in-built deformation during assembly (so as to prevent operational difficulties).

According to the present invention, there is provided a flexible coupling for transmitting power between shafts, the coupling comprising first and second transmission members connectible with first and second shafts for rotation therewith, and a flexible element between and interconnecting the transmission members, the flexible element being located relative to the transmission members partially, by devices for transmitting power and partially by a location means which predetermines a desired amount of in-built deformation of the flexible element.

There may be a plurality of flexible elements with a transmission member connected between adjacent flexible elements.

Preferably the transmission members are substantial in nature when compared to the or each flexible element.

Preferably the or each flexible element is capable of a degree of deformation which does not require the use of excessive force during assembly.

Preferably the location means is of simple construction requiring the minimum of high precision production.

Preferably the location means is integral with the transmission members.

Preferably the flexible element forms part of a sub-assembly prior to being deformed in final assembly.

Also according to the present invention there is provided a flexible coupling used to transmit power between two shafts consisting of a transmission member for solid attachment to each of the shafts, each transmission member being connected to a flexible element at two or more locations by means of bolts or pins, said flexible element consisting of a pack of membranes held together as a sub-assembly by means of a sleeve and a collar, the collar being a press-fit over a part of the sleeve, said flexible element sub-assembly being deformed to a predetermined degree by a spigot formed on the transmission members acting upon the collar or sleeve, and said spigot being removed at two or more points remote from the connection locations on the transmission members to facilitate assembly.

Also according to the present invention, there is a coupling as defined in the immediately preceding paragraph in which the transmission members are connected by two flexible element sub-assemblies of a similar nature, there being an intermediate transmission member between the flexible elements, said intermediate member being connected to each flexible element in a manner similar to the transmission members, and each transmission member having a spigot.

An embodiment of the present invention will now be described by way of example, with reference to the accompanying drawings, in which.

Figure 2:
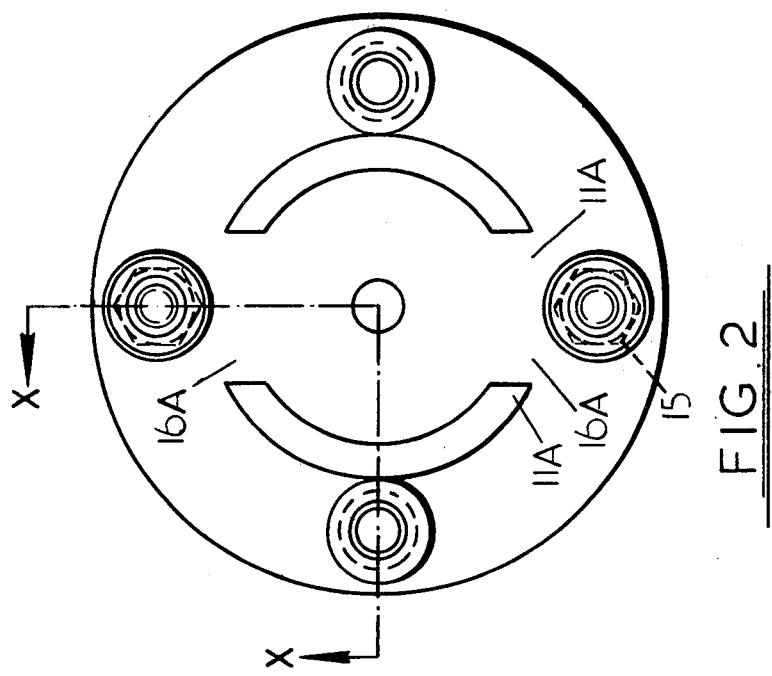
FIG. 2 is a sectional view on the line Y—Y of FIG. 1.
Figure 1:
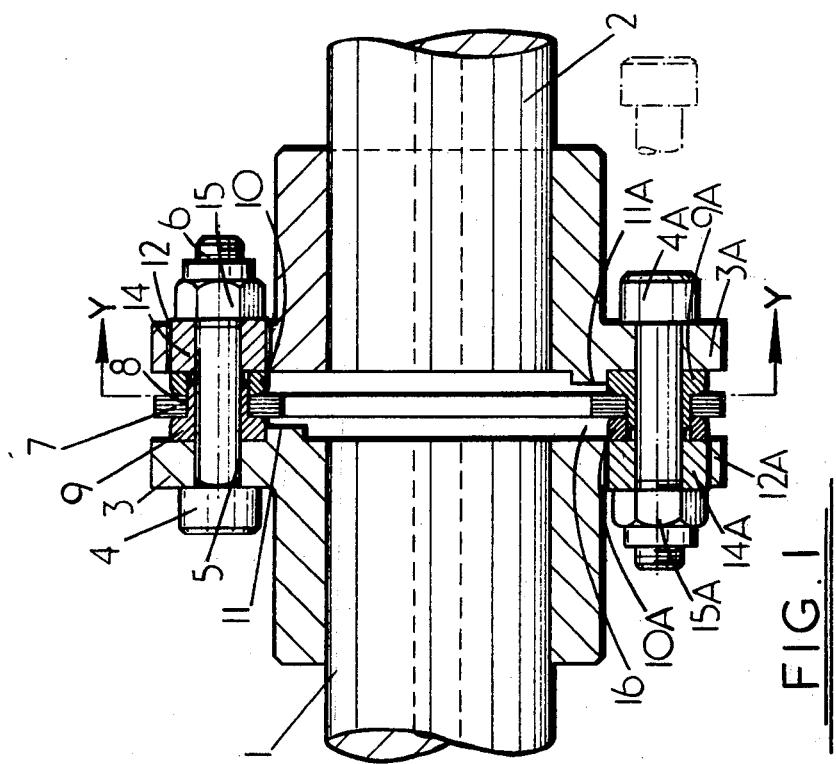
FIG. 1 is a sectional view of the line X—X of FIG. 2.

Referring to the drawing, a driving shaft 1 is connected to a driven shaft 2 by flexible means for the transmission of power. A flanged transmission member 3 is solidly connected to the shaft 1 by means of an interference fit and is driven by a key (not shown). Power is transmitted via the flange of the transmission member 3 to a bolt 4 located in a hole 5 in the flange lying on a pitch circle diameter/$6^{(P.C.D.)}$. The flexible means comprises a number of membranes 7 through which are holes 8 of nominally the same P.C.D. 6 as the transmission member 3. A flanged threaded sleeve 9 is located through each hole 8 and the membranes 7 are formed into a flexing element sub-assembly by press fitting a washer or collar 10 on the outer diameter of the sleeve 9 to retain the membranes 7 against the flange of the sleeve 9. This sub-assembly is then bolted to the transmission member 3 by the bolts 4, the collar 10 locating upon a spigot 11 formed on the transmission member 3. Holes 12 are drilled in a second flanged transmission member 3A connected to the driven shaft 2 and the bolts 4 pass through the holes 12. A washer 14 is positioned around each bolt 4 to fit within each hole 12 and bring the nuts 15 screwed onto the bolts 4 into an accessible position.

Similarly the driven shaft 2 is connected to the flanged transmission member 3A which is in turn connected by bolts 4A to the flexing element sub-assembly by means of a sleeve 9A and collar 10A. The membranes 7 are located on a spigot 11A of the transmission member 3A. The spigots 11 and 11A are cut away at positions 16 and 16A to facilitate assembly of the coupling. In a similar fashion, holes 12A are drilled in the first flanged transmission member 3 to accommodate the bolts 4A, a washer 14A being positioned around each bolt 4A in each hole 12A to place nuts 15A in an accessible position.

It will be apparent from the description that the holes 5 in the transmission member 3, holes 5A in transmission member 3A and holes 8 in the membranes 7 are of nominally the same P.C.D. It will also be appreciated that the provision of such holes to a high level of precision is a complex manufacturing task. Discrepancies in the relative diametrical position of the holes 5, 5A and 8 due to manufacturing tolerances can cause unacceptable deformation of the membranes 7 on assembly and could cause problems in the use of the coupling. Again, the outside diameters of the sleeves 9, 9A and the collars 10, 10A are same so that pressure is equally distributed over the faces of the flanged transmission members 3, 3A.

The relative location of the holes 5, 5A and 8 is partially determined by means of the spigots 11, 11A and the collars 10, 10A thus allowing a relaxation of the tolerances of the holes 5, 5A and 8 and the P.C.D. 6.

The invention also provides for imparting a slight tensile deformation to the membranes 7 to prevent usage problems due to the interaction of the spigots and washers.

It will be appreciated that the above arrangement of coupling is by way of example only and other arrangements, utilising other means of deforming the membranes, can be designed.

What is claimed is:

1. A flexible coupling for transmitting power between a driving member and a driven member, the coupling comprising:
   a first transmission member connectable with the driving member;
   a second transmission member connectable with the driven member and axially spaced from the first transmission member;
   a flexible element sub-assembly disposed between the first and second transmission members and drivingly interconnecting them, the sub-assembly comprising a pack of flexible membranes formed adjacent to, but inwardly of their peripheral edges with equi-angularly spaced holes, a sleeve extending through each hole and having a flange abutting one face of the pack of flexible membranes; and
   a spigot on each first and second transmission member projecting towards and axially spaced from the other respective transmission member, each spigot having a collar and each being located in such disposition on the transmission member that it peripherally contacts the adjacent collar of the other transmission member with an outwardly-directed force to thereby deform the flexible membranes to a predetermined amount.

2. A flexible coupling as claimed in claim 1, in which the spigot on each transmission member is of annular configuration cutaway at two diametrically-opposed locations to facilitate coupling assembly.

* * * * *